United States Patent [19]

Masaki et al.

[11] 4,362,319
[45] Dec. 7, 1982

[54] STEERING ASSEMBLY SUPPORTING DEVICE OF A MOTOR VEHICLE

[75] Inventors: Kunihiko Masaki; Naoto Kitagawa, both of Toyota; Kosaku Yamada, Nagoya, all of Japan

[73] Assignee: Toyota Jidosha Kogyo Kabushiki Kaisha, Toyota, Japan

[21] Appl. No.: 188,254

[22] Filed: Sep. 17, 1980

[30] Foreign Application Priority Data

Jun. 11, 1980 [JP] Japan ................................... 55-77849

[51] Int. Cl.³ .............................................. B62D 1/18
[52] U.S. Cl. ....................................... 280/779; 74/492
[58] Field of Search ....................... 280/777, 779, 750; 74/492; 188/1 C

[56] References Cited

U.S. PATENT DOCUMENTS 4,241,937 12/1980 Eggen et al. ........................ 280/777

Primary Examiner—Richard A. Bertsch
Attorney, Agent, or Firm—Kenyon & Kenyon

[57] ABSTRACT

A steering assembly supporting device of a motor vehicle comprising a horizontally extending base portion and a vertically extending leg portion. The base portion extends in parallel to the cowl inner panel at a position which is arranged in the rear of and remote from the cowl inner panel. The opposite ends of the base portion are fixed onto the corresponding cowl side panels and the lower end of the leg portion is fixed onto the floor. The base portion is fixed onto the cowl inner panel via a bracket. The steering tube of the steering assembly is supported by the base portion.

9 Claims, 10 Drawing Figures

STEERING ASSEMBLY DEVICE OF A MOTOR VEHICLE

DESCRIPTION OF THE INVENTION

The present invention relates to a steering assembly supporting device of a motor vehicle.

The body of a motor vehicle normally comprises cowl side panels extending forward from the front ends of corresponding front door opening flanges, a cowl inner panel arranged to extend between the cowl side panels at a position beneath a wind shielding glass, and a dash panel separating a driver's compartment from an engine compartment. In addition, in a motor vehicle, the tip of a steering tube passes through the dash panel and extends to the inside of the engine compartment. In such a motor vehicle, the steering tube, used for supporting a steering shaft, is normally supported in such a way that the intermediate portion of the steering tube is fixed onto both the cowl inner panel and the dash panel via a steering support, and that the steering tube is fixed onto the dash panel at a position wherein the steering tube passes through the dash panel. However, in the case wherein the steering tube is supported as mentioned above, since the distance between the rear end of the steering support, at which the steering tube is supported, and the front end of the steering support, at which the steering support is fixed onto the cowl inner panel, is very long, when a motor vehicle is driven at a high speed or on a rough load, a problem occurs in that the steering wheel vibrates.

An object of the present invention is to provide a steering assembly supporting device capable of preventing the steering wheel from vibrating.

According to the present invention, there is provided a steering assembly suporting device of a motor vehicle comprising a steering assembly, a floor, front door opening flanges, first and second cowl side panels each extending forward from a front end of the corresponding front door opening flange, front pillars each forming a portion of the corresponding front door opening flange and having a root portion connected to the corresponding cowl side panel, a cowl inner panel spaced from the floor and transversely extending substantially in parallel to the floor at a position above the floor, and a dash panel arranged between the floor and the cowl inner panel, said device comprising: a steering assembly supporting base portion transversely extending substantially in parallel to the cowl inner panel and comprising a first end fixed onto the first cowl side panel, a second end fixed onto the second cowl side panel, a central portion and an intermediate portion located between said first end and said central portion, the steering assembly being supported by the intermediate portion of said base portion, and; a leg portion extending downward from the central portion of said base portion and having a lower end fixed onto the floor.

The present invention may be more fully understood from the description of a preferred embodiment of the invention set forth below, together with the accompanying drawings.

DESCRIPTION OF A PREFERRED EMBODIMENT

Figure 1:
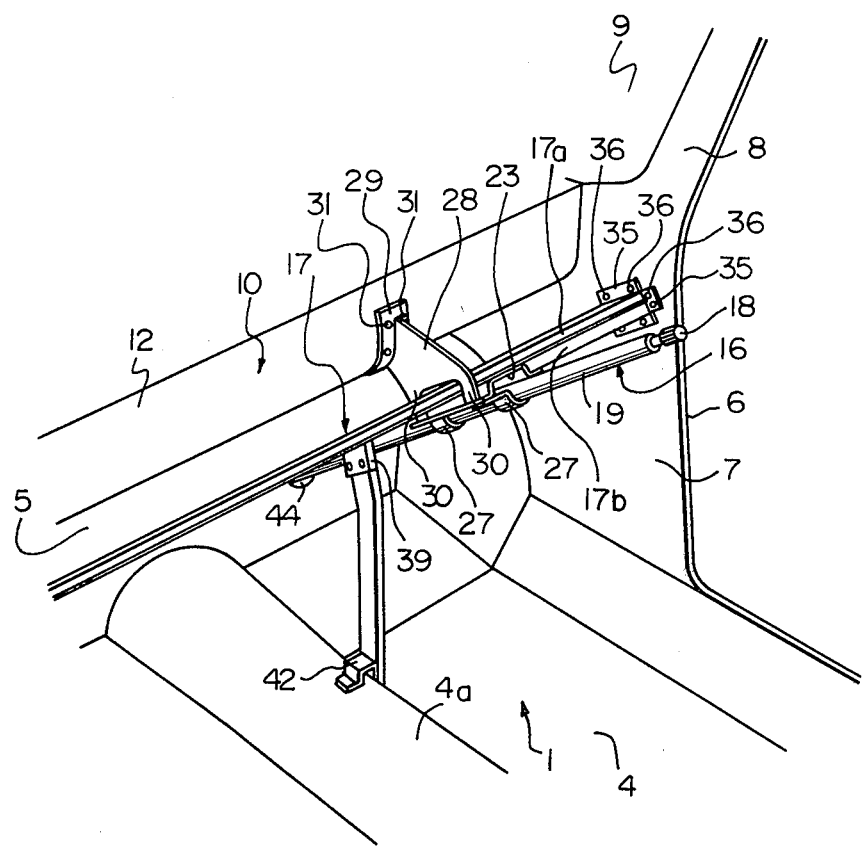
FIG. 1 is a perspective view of the interior of the driver's compartment of a motor vehicle.
Figure 2:
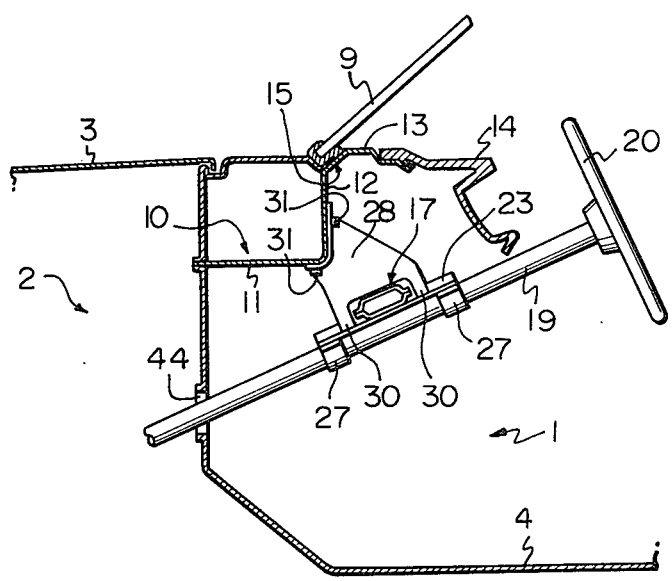
FIG. 2 is a cross-sectional side view of FIG. 1.
Figure 3:
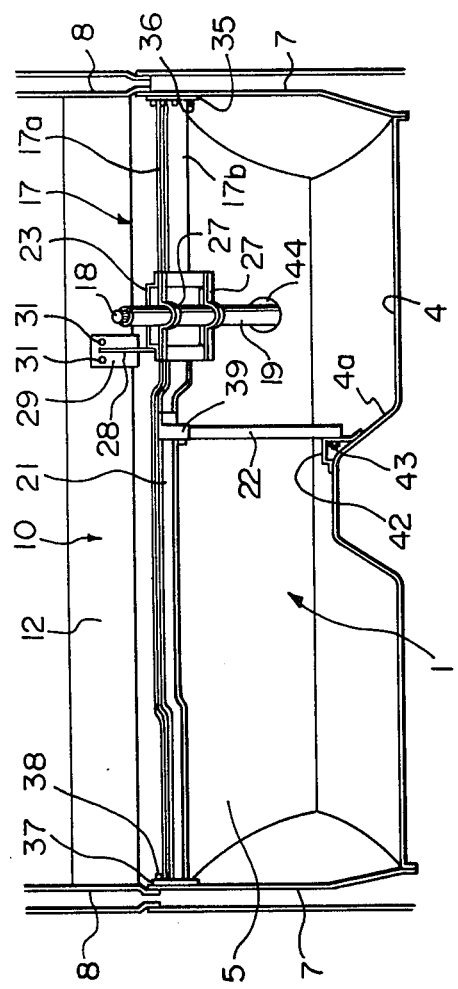
FIG. 3 is a front view of FIG. 1.
Figure 4:
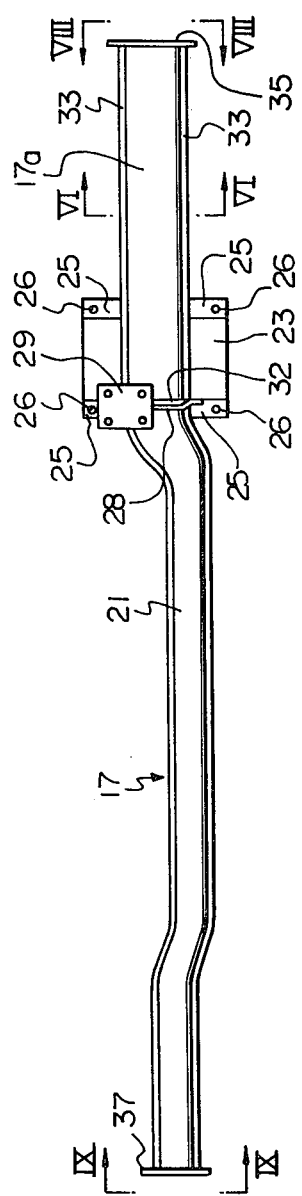
FIG. 4 is a plan view of a steering assembly supporting device according to the present invention.
Figure 5:
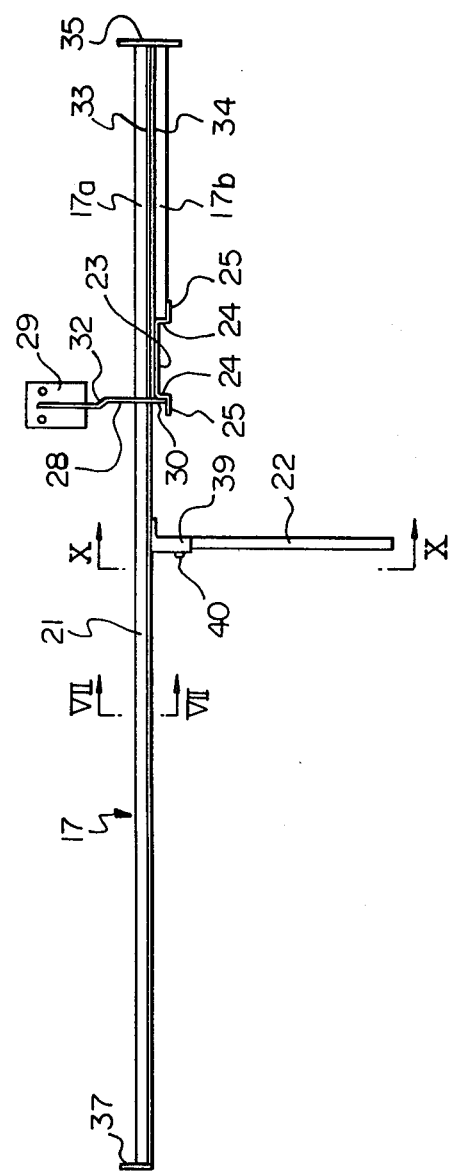
FIG. 5 is a side view of FIG. 4.
Figure 6:
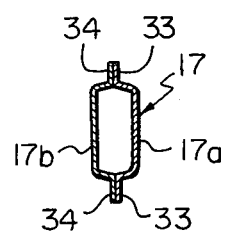
FIG. 6 is a cross-sectional view taken along the line VI—VI in FIG. 4.
Figure 7:
FIG. 7 is a cross-sectional view taken along the line VII—VII in FIG. 5.
Figure 8:
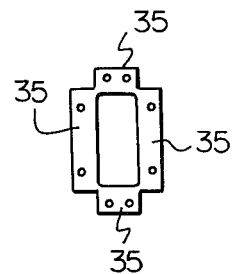
FIG. 8 is a side view taken along the line VIII—VIII in FIG. 4.

Referring to FIGS. 1 through 3, 1 designates a driver's compartment, 2 an engine compartment, 3 an engine hood and 4 a floor; 5 designates a vertically extending dash panel separating the driver's compartment 1 from the engine compartment 2, 6 front door opening flanges, 7 cowl side panels, each extending forward from the front end of the corresponding front door opening flange 6, 8 front pillars, each forming a portion of the corresponding front door opening flange 6 and supporting the roof (not shown) of a motor vehicle, and 9 designates a wind shielding glass. A cowl inner panel 10 is arranged to extend between the cowl side panels 7. As illustrated in FIG. 2, the cowl inner panel 10 comprises a bottom wall 11 extending substantially in parallel to the floor 4, a side wall 12 vertically extending upwards from the rear end of the bottom wall 11 and an extension wall 13 extending backwards from the upper end of the side wall 12. A dash board 14 is mounted on the rear end of the extension wall 13. The front end of the bottom wall 11 of the cowl inner panel 10 is fixed onto the top end of the dash panel 5, and the bottom end of the wind shielding glass 9 is supported on a bending portion 15 located between the side wall 12 and the extension wall 13. As illustrated in FIGS. 1 through 3, a steering assembly 16 and a steering assembly supporting body 17 are arranged within the driver's compartment 1. The steering assembly 16 comprises a steering shaft 18, a steering tube 19 enclosing the steering shaft 18 and supporting it, and a steering wheel 20 fixed onto the end of the steering shaft 18. The steering assembly supporting body 17 comprises a base portion 21 extending substantially in parallel to the cowl inner panel 10 at a position below the cowl inner panel 10, and a substantially vertically extending leg portion 22 extending downwards from the central portion of the base portion 21. As illustrated in FIGS. 1 and 5, a steering support 23, having a dish shaped cross-section, is welded onto the bottom wall of the base portion 21, which is located above the steering tube 19. The steering support 23 comprises a pair of opposed side walls 24, and a pair of flanges 25, each extending outwards from the corresponding side wall 24. As illustrated in FIG. 4, the steering support 23 projects forward and backward from the steering assembly supporting body 17, and bolt holes 26 are formed on the flanges 25 of the projecting portion of the steering assembly support body 17. As illustrated in FIGS. 1 through 3, a pair of spaced brackets 27 is fixed onto the steering tube 19 and secured onto the flanges 25 of the steering support 23 by bolts (not shown) which are inserted into the bolt holes 26 (FIG. 4). As illustrated in FIGS. 1 and 2, a bracket 28 is arranged between the steering assembly supporting body 17 and the cowl inner panel 10. The bracket 28 has on its one end a mounting flange 29 formed in one piece and has on its other end a pair of spaced arms 30 projecting downward. As illustrated in FIG. 2, the mounting flange 29 of the bracket 28 is fixed onto both the bottom wall 11 and the side wall 12 of the cowl inner panel 10 by means of bolts 31 and, as illustrated in FIGS. 1 and 5, a pair of arms 30 of the bracket 28 is welded onto the side wall 24 of the steering support 23. In addition, as illustrated in FIGS. 4 and 5, a step portion 32 is formed on the bracket 28.

As illustrated in FIGS. 1 through 6, a portion of the base portion 21, which is located on the right side of the steering support 23, comprises a pair of members 17a, 17b, each having a dish shaped cross-section. The member 17a has a pair of outwardly extending flanges 33, and the member 17b has a pair of outwardly extending flanges 34. The members 17a and 17b are interconnected to each other in such a way that the flanges 33 of the member 17a are welded to the corresponding flanges 34 of the member 17b by spot welding. Consequently, it will be understood that the steering assembly supporting body 17, located on the right side of the steering support 23, has a hollow tubular shape. On the other hand, a portion of the base portion 21, which is located on the left side of the steering support 23, comprises only the member 17a and, thus, has a dish shaped cross-section. As illustrated in FIG. 4, the portion of the base portion 21, which is located in the right side of the steering support 23, has an approximately uniform width. In addition, the portion of the base portion 21, which is located on the left side of the steering support 23, has a width smaller than that of the portion of the base portion 21, which is located on the right side of the steering support 23.

Figure 9:
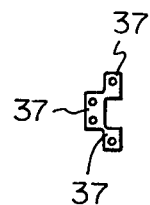
FIG. 9 is a side view taken along the line IX—IX in FIG. 4.
Figure 10:
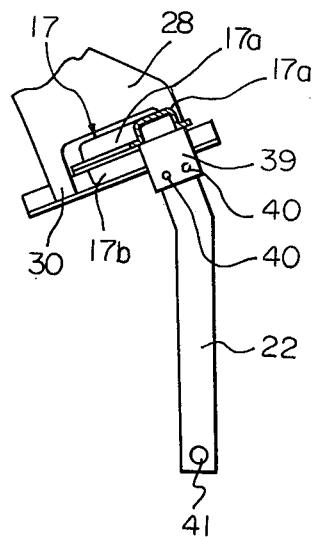
FIG. 10 is a cross-sectional side view taken along the line X—X in FIG. 5.

As illustrated in FIGS. 1, 3, 4 and 8, a flange 35 is formed in one piece on the right end of the base portion 21 of the steering assembly support body 17 and secured onto the cowl side panel 7 by means of bolts 36 at the root portion of the front pillar 8. In addition, as illustrated in FIGS. 3, 4 and 9, a flange 37 is formed in one piece on the left end of the base portion 21 of the steering assembly support body 17 and secured onto the cowl side panel 7 by means of bolts 38 at the root portion of the front pillar 8. However, instead of securing the flanges 35 and 37 onto the corresponding cowl side panels 7 by means of the bolts 36 and 38, respectively, the flanges 35 and 37 may be welded onto the corresponding cowl side panels 7. As illustrated in FIG. 10, a bracket 39 is welded onto the member 17a, and the upper end of the leg portion 22 is secured onto the bracket 39 by means of bolts 40. In addition, a bolt hole 41 is formed on the lower end of the leg portion 22. As illustrated in FIGS. 1 and 3, the floor 4 has a raised portion 4a so that the transmission of an engine (not shown) is arranged beneath the raised portion 4a. A bracket 42 is fixed onto the raised portion 4a, and the lower end of the leg portion 22 of the steering assembly supporting body 17 is secured onto the bracket 42 by means of a bolt 43 which is inserted into the bolt hole 41 (FIG. 10) of the leg portion 22. However, instead of securing the lower end of the leg portion 22 onto the bracket 42 by means of the bolt 43, the lower end of the leg portion 22 may be welded onto the bracket 42. As illustrated in FIGS. 1 through 3, a hole 44 is formed on the dash panel 5, and the steering tube 19 passes through the hole 44.

In addition, in the present invention, the steering support 23 is mounted on the steering assembly supporting body 17 arranged in the rear of the cowl inner panel 10, and the steering tube 19 is supported on the front end and the rear end of the steering support 23. Consequently, since the distance between the supporting point of the steering support 23, at which the steering tube 19 is supported, and the fixing point of the steering support 23, at which the steering support 23 is fixed onto the steering assembly supporting body 17, is short, it is possible to prevent the steering wheel 20 from vibrating when a motor vehicle is driven at a high speed or on a rough load.

We claim:

1. A steering assembly supporting device of a motor vehicle comprising a steering assembly, a floor, front door opening flanges, first and second cowl side panels each extending forward from a front end of the corresponding front door opening flange, front pillars each forming a portion of the corresponding front door opening flange and having a root portion connected to the corresponding cowl side panel, a cowl inner panel spaced from the floor and transversely extending substantially in parallel to the floor at a position above the floor, and a dash panel arranged between the floor and the cowl inner panel, said device comprising;

a steering assembly supporting base portion transversely extending substantially in parallel to the cowl inner panel and comprising a first end fixed onto the first cowl side panel, a second end fixed onto the second cowl side panel, a central portion, an intermediate portion located between said first end and said central portion and supporting said steering assembly thereon, a first portion located between said first end and said intermediate portion and having a hollow tubular cross-section, and a second portion of dish shaped cross-section located between said second end and said intermediate portion; and a leg portion connected to said second portion and central portion of said base portion and having a lower end fixed onto the floor.

2. A steering assembly supporting device of a motor vehicle comprising a steering assembly, a floor, front door opening flanges, first and second cowl side panels each extending forward from a front end of the corresponding front door opening flange, front pillars each forming a portion of the corresponding front door opening flange and having a root portion connected to the corresponding cowl side panel, a cowl inner panel spaced from the floor and transversely extending substantially in parallel to the floor at a position above the floor, and a dash panel arranged between the floor and the cowl inner panel, said device commprising;

a steering assembly supporting base portion transversely extending substantially in parallel to the cowl inner panel and comprising a first end fixed onto the first cowl side panel, a second end fixed onto the second cowl side panel, a central portion, an intermediate portion located between said first end and said central portion and supporting said steering assembly thereon, a first portion located between said first end and said intermediate portion and having a hollow tubular cross-section, and a second portion located between said second end and said intermediate portion, said first portion comprising a first member having a dish shaped cross-section and a second member having a dish shaped cross-section fixed to said first member; and a leg portion connected to said second portion and extending downward from the central portion of said base portion and having a lower end fixed onto the floor.

3. A steering assembly supporting device as claimed in claim 2, wherein said first member has a pair of outwardly extending flanges, said second member having a pair of outwardly extending flanges, each being welded to the corresponding flange of said first member by spot welding.

4. A steering assembly supporting device of a motor vehicle comprising a steering assembly, a floor, front door opening flanges, first and second cowl side panels each extending forward from a front end of the corresponding front door opening flange, front pillars each forming a portion of the corresponding front door opening flange and having a root portion connected to the corresponding cowl side panel, a cowl inner panel spaced from the floor and transversely extending substantially in parallel to the floor at a position above the floor, and a dash panel arranged between the floor and the cowl inner panel, said device comprising:

a steering assembly supporting base portion transversely extending substantially in parallel to the cowl inner panel and comprising a first end fixed onto the first cowl side panel at said root portion of a respective front pillar, a central portion and an intermediate portion located between said first end and said central portion, the steering assembly being supported by the intermediate portion of said base portion, and;

a leg portion extending downward from the central portion of said base portion and having a lower end fixed onto the floor.

5. A steering assembly supporting device of a motor vehicle comprising a steering assembly, a floor, front door opening flanges, first and second cowl side panels each extending forward from a front end of the corresponding front door opening flange, front pillars each forming a portion of the corresponding front door opening flange and having a root portion connected to the corresponding cowl side panel, a cowl inner panel spaced from the floor and transversely extending substantially in parallel to the floor at a position above the floor, and a dash panel arranged between the floor and the cowl inner panel, said device comprising;

a steering assembly supporting base portion transversely extending substantially in parallel to the cowl inner panel and comprising a first end fixed onto the first cowl side panel, a second end fixed onto the second cowl side panel, a central portion and an intermediate portion located between said first end and said central portion, the steering assembly being supported by the intermediate portion of said base portion;

a leg portion extending downward from the central portion of said base portion and having a lower end fixed onto the floor; and a bracket extending backward from the cowl inner panel and having a rear end and a front end fixed onto the cowl inner panel, said rear end being connected to said intermediate portion of said base portion.

6. A steering assembly supporting device as claimed in claim 5, wherein said bracket has a transversely extending step portion formed thereon.

7. A steering assembly supporting device of a motor vehicle comprising a steering assembly, a floor, front door opening flanges, first and second cowl side panels each extending forward from a front end of the corresponding front door opening flange, front pillars each forming a portion of the corresponding front door opening flange and having a root portion connected to the corresponding cowl side panel, a cowl inner panel spaced from the floor and transversely extending substantially in parallel to the floor at a position above the floor; and a dash panel arranged between the floor and the cowl inner panel, said device comprising;

a steering assembly supporting base portion transversely extending substantially in parallel to the cowl inner panel and comprising a first end fixed onto the first cowl side panel, a second end fixed onto the second cowl side panel, a central portion and an intermediate portion located between said first end and said central portion, the steering assembly being supported by the intermediate portion of said base portion;

a leg portion extending downward from the central portion of said base portion and having a lower end fixed onto the floor; and a steering support fixed onto said immediate portion of said base portion and supporting thereon a steering tube of the steering assembly.

8. A steering assembly supporting device as claimed in claim 7, wherein said support comprises a front end extending forward from said base portion, and a rear end extending backward from said base portion, the steering tube being supported by both said front end and said rear end of said support.

9. A steering assembly supporting device of a motor vehicle comprising a steering assembly having a steering tube, a floor, front door opening flanges, first and second cowl side panels each extending forward from a front end of the corresponding front door opening flange, front pillars each forming a portion of the corresponding front door opening flange and having a root portion connected to the corresponding cowl side panel, a cowl inner panel spaced from the floor and transversely extending substantially in parallel to the floor at a position above the floor, and a dash panel arranged between the floor and the cowl inner panel and having a hole formed therein with said steering tube passing therethrough without contacting said dash panel, said device comprising;

a steering assembly supporting base portion transversely extending substantially in parallel to the cowl inner panel and comprising a first end fixed onto the first cowl side panel, a second end fixed onto the second cowl side panel, a central portion and an intermediate portion located between said first end and said central portion, the steering assembly being supported by the intermediate portion of said base portion, and;

a leg portion extending downward from the central portion of said base portion and having a lower end fixed onto the floor.

* * * * *